United States Patent [19]

Veith

[11] Patent Number: 4,978,190

[45] Date of Patent: Dec. 18, 1990

[54] SERVO-CONTROLLED LIGHT COUPLING BETWEEN A LIGHT-EMITTING COMPONENT AND AN OPTICAL FIBER

[75] Inventor: Gustav Veith, Hemmingen, Fed. Rep. of Germany

[73] Assignee: Alcatel N.V., Amsterdam, Netherlands

[21] Appl. No.: 404,770

[22] Filed: Sep. 8, 1989

[30] Foreign Application Priority Data

Sep. 20, 1988 [DE] Fed. Rep. of Germany ....... 3831839

[51] Int. Cl.$^5$ ............................ G02B 6/32; G02B 6/26; G02B 6/36; H01J 5/16
[52] U.S. Cl. ................................ 350/96.18; 350/96.20; 250/227.14
[58] Field of Search ............... 350/96.15, 96.18, 96.20, 350/96.21; 250/227, 227.4

[56] References Cited

U.S. PATENT DOCUMENTS

| | | | |
|---|---|---|---|
| 4,296,998 | 10/1981 | Dufft | 350/90.20 |
| 4,545,643 | 10/1985 | Young et al. | 350/96.18 X |
| 4,722,586 | 3/1988 | Dodson et al. | 350/90.20 |

OTHER PUBLICATIONS

"Optical Technology for Compact Disk Pickups", by Lee Lasers & Optronics, Sep. 1986, pp. 85-87.
"Neue Audiotechnik aus dem Schwartzwald", *Funkschau*, No. 4/1986, pp. 30-33.

*Primary Examiner*—Akm Ullah
*Attorney, Agent, or Firm*—Christie, Parker & Hale

[57] ABSTRACT

An optical module is used for communication over optical waveguides. To couples laser light to or from the optical waveguide (3) with as little loss as possible, the laser diode (2) must be precisely aligned with respect to the core region (22) of the end face (14) of the optical waveguide. In conventional modules, this requires costly and complicated mechanical couplers, which nevertheless do not have the necessary long-term stability. To solve the problem of how to provide a low-cost laser-to-fiber coupling which exhibits long-term stability, the optical module (1) is provided with a control facility (16, 17, 18) which controls the coupling of light on the basis of measurements of the differences in reflection factor between the core region (22) and the cladding region (23) of the end face of the optical waveguide (3). For this measurement and control, use can be made of low-priced components employed in CD players.

9 Claims, 3 Drawing Sheets

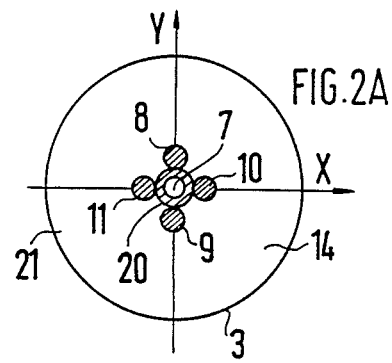
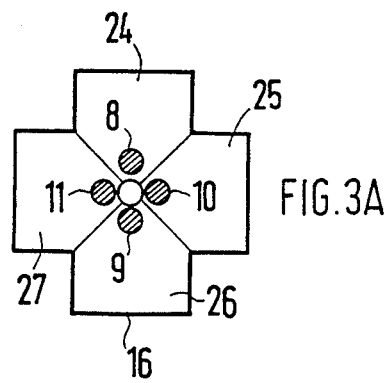
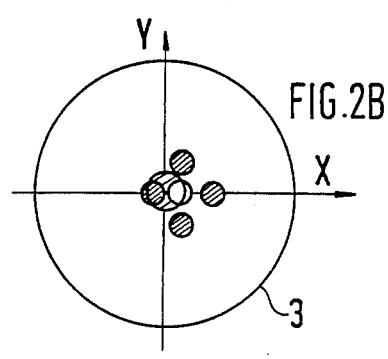
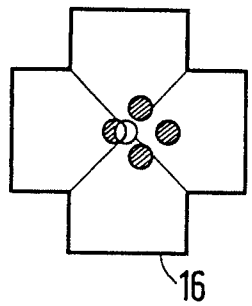
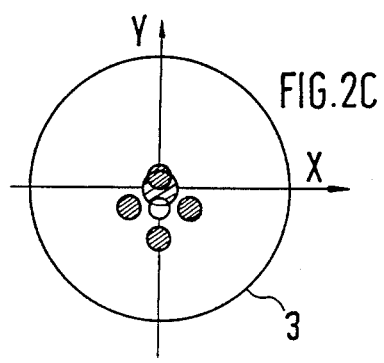
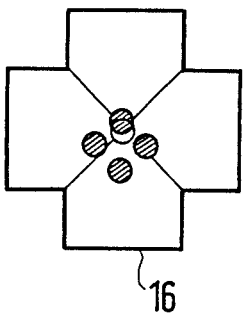

SERVO-CONTROLLED LIGHT COUPLING BETWEEN A LIGHT-EMITTING COMPONENT AND AN OPTICAL FIBER

TECHNICAL FIELD

The present invention relates to an optical transmitter or receiver module comprising a light-emitting optoelectronic component and/or a light-receiving optoelectronic component and a light-signal-transmitting optical waveguide coupled thereto.

CLAIM FOR PRIORITY

This application is based on and claims priority from an application first filed in Fed. Rep. Germany on 20 Sept. 1988 under Ser. No. 38 31 839.3. To the extent such prior application may contain any additional information that might be of any assistance in the use and understanding of the invention claimed herein, it is hereby incorporated by reference.

BACKGROUND ART

Such optical modules are used, for example, as signal transmitters or receivers for optical-waveguide transmission links which are used in communication systems to an increasing extent. Light generated in a laser, for example, is coupled into an optical waveguide in the form of a glass fiber, which serves as a transmission medium, and coupled out at the receiving end of the link to an optoelectronic receiver. To minimize coupling losses, the optoelectronic component must be precisely aligned with respect to the end face of the respective light-conducting glass-fiber core. The coupling should be reliable and exhibit long-term and temperature stability.

In prior art transmitter and receiver modules, this requirement is met by costly and complicated precision-mechanical devices (German Patent No. 30 46 415 (corresponding to U.S. Pat. No. 4,296,998), French Published Application No. 2 591 763 (corresponding to U.S. Pat. No. 4,722,586) which must hold very tight tolerances and require high-strength, expensive materials. This adds to the manufacturing costs of the optical components. In addition, their long-term stability is still insufficient.

In CD players, it is known to focus the laser beam, with which the sound information recorded on the disk in digital form is read, on the disk in a vertical direction, i.e., in a direction perpendicular to the disk. This requires a control accuracy of $\pm 1$ $\mu$m. In addition, the pickup unit must be caused to follow the very narrow information tracks on the disk. To this end, the pickup unit is adjusted radially with an accuracy of $\pm 0.1$ $\mu$m ("Neue Audiotechnik aus dem Schwartzwald", Funkschau, No. 4/1986, pp. 30-33; W. H. Lee, "Optical technology for compact disk pickups", *Lasers & Optronics*, Sept. 1986, pp. 85-87). The necessary accuracies entail considerable expense. Moreover, such prior art pickup units move the laser beam in only one dimension.

DISCLOSURE OF INVENTION

It is the object of the invention to provide an optical transmitter or receiver module in which long-term-stable optical coupling is ensured without reservation.

This object is attained by providing the optical component with a control facility which controls the coupling of light between the optoelectronic component and the optical waveguide on the basis of measurements of differences in reflection factor between the core region and the cladding region of the end face of the optical waveguide.

An easy-to-evaluate measurement signal for the control can be obtained by providing the cladding region of the end face of the optical waveguide with a reflecting coating. In addition, the core region of the end face of the optical waveguide may be provided with an antireflection coating.

The principal advantages of the invention are that long-term stability of the optical coupling can be achieved by simple means, and that use can be made of low-cost components employed in entertainment-electronics equipment. The necessary changes can be made at low cost.

The alignment tolerance required is much smaller since the light-conducting core of a single-mode fiber normally has a diameter of 9 to 10 $\mu$m.

BRIEF DESCRIPTION OF DRAWINGS

Embodiments of the invention will now be explained with reference to the accompanying drawings, in which:

FIGS. 2A to 2C whos the end face of an optical waveguide with different coupling alignments;

FIGS. 3A to 3C show a detector used in the optical component according to the invention with the alignments of FIGS. 2A to 2C;

BEST MODE FOR CARRYING OUT THE INVENTION

Figure 1:
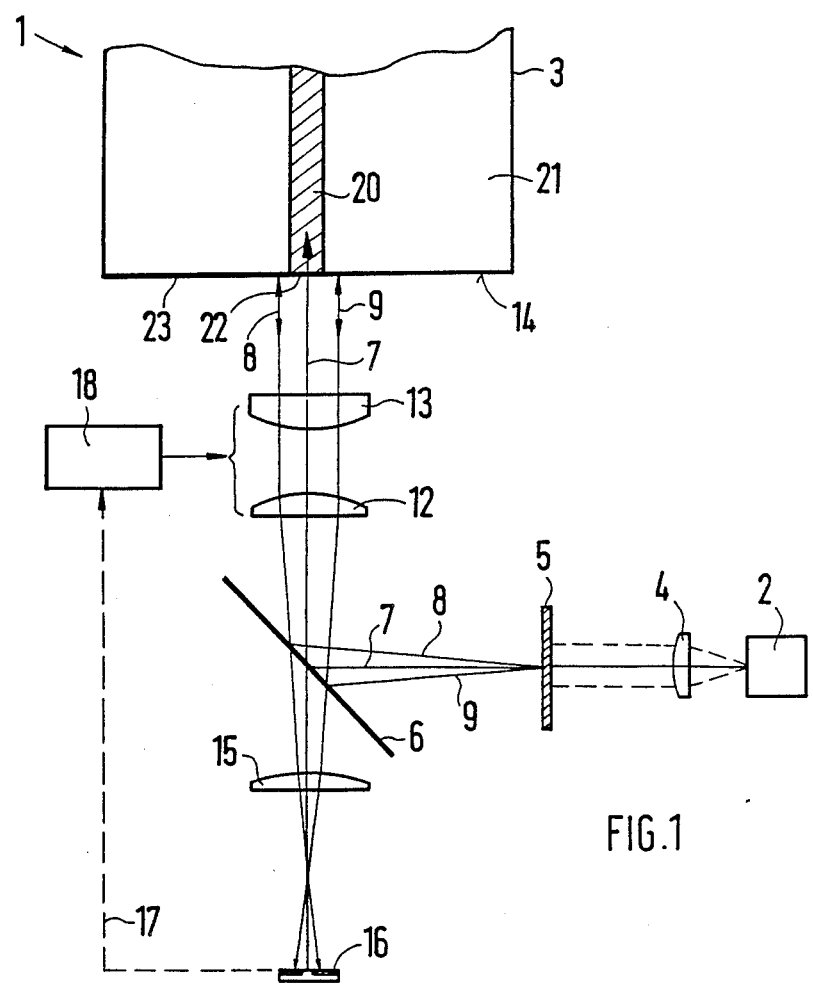
FIG. 1 shows an optical transmitter module with actively controlled laser-to-fiber coupling.

An optical transmitter or receiver module—hereinafter referred to as "transmitter" or "receiver", respectively—1 includes a laser diode 2, which produces the light signals to be transmitted, and an optical waveguide 3, which serves as a transmission medium for the light signals and of which only the end on the transmitter side is shown—not to scale—in FIG. 1.

The light generated by the laser diode 2 passes through a collimating lens 4 to a diffraction grating 5, from which it goes to a beam splitter 6. Besides an undeviated ray 7, first-order diffracted rays 8, 9 and higher-order diffracted rays (not shown and not considered in the following) reach the beam splitter 6.

The diffraction grating 5 is designed as a crossed grating, so that it also produces first-order rays 10, 11 diffracted in a plane perpendicular to the plane of the paper, which are not shown in FIG. 1 but can be seen in FIGS. 2 and 3.

The laser light rays are reflected at the beam splitter 6, which is designed, for example, as a semitransparent mirror, and pass through a moving lens system consisting of a collimating lens 12 and an objective lens 13 to the end face 14 of the optical waveguide 3. At the end face 14, the rays 7 to 11 are reflected in the manner described below. They pass through the lens system 12, 13, the beam splitter 6, and a lens 15 to a detector 16.

The evaluation in the detector 16 or in an evaluating circuit connected thereto gives an error signal which is transferred over a control line 17 to an electro-mechanical positioning device 18. This positioning device 18 moves the lens system 12, 13 in accordance with the error signal in the x- and y-directions, i.e., in a plane parallel to the end face 14.

The optical waveguide 3 has a light-conducting core 20 and a cladding 21 surrounding the core, as is well known. In a single-mode fiber, the core 20 commonly has a diameter of 9 to 10 $\mu$m.

The control of the loss-free coupling of laser light into the optical waveguide 3 is based on the fact that theh desired focus of the laser beam, i.e., the core region 22 of the end face 14 of the optical waveguide 3, has an optical reflection factor different from that of the surrounding cladding region 23. At a relative refractive index step difference between the core region 22 and the cladding region 23 of about 1%, the relative change in reflectivity between the core region and the cladding region is about 5%. This change in reflectivity is generally too small to obtain reliable measurement values for control purposes. Therefore, the end face 14 of the optical waveguide 3 is so prepared that there is a greater difference between the reflection factors $R_K$ of the core region 22 and $R_M$ of the cladding region 23. This can be done in three ways:

(a) providing the cladding region 23 of the end face 14 with a reflecting coating, e.g., an aluminum coating, (b) providing the core region 22 of the end face 14 with an antireflection coating, or (c) providing the cladding region 23 of the end face 14 with a reflecting coating, and the core region 22 with an antireflection coating.

The methods of preparation (a) to (c) can be easily carried out using photolithographic techniques. To mark the core region 22 and perform photolithographic exposure steps, advantage can be taken of the light-conducting properties of the glass-fiber core 20 by coupling light into the other end of the fiber.

The following table shows the reflection factors $R_K$ of the core region and $R_M$ of the cladding region of the end face 14 which are attainable by the above-described preparations of the end face 14, and the reflection/factor ratios $r = R_M/R_K$ resulting therefrom.

| Preparation of Fiber End Face | $R_K$ (%) | $R_M$ (%) | $r = R_M/R_K$ |
|---|---|---|---|
| Uncoated | 3.5 | 3.7* | 1.06 |
| Reflection coating on cladding region | 3.5 | 99.0 | 28 |
| Antireflection coating on core region | 1.0 | 3.7* | 3.7 |
| Reflection coating on cladding region & antireflection coating on core region | 1.0 | 99.0 | 99 |

*Assumption: refractive-index step (K/M): n = 1%

Method (a) is the simplest to carry out and gives a reflection factor of the cladding region 23 which is 28 times that of the core region 22.

Method (b) gives a reflection factor of the cladding region which is only 3.7 times that of the core region, but this method has the advantage that reflections to the laser diode are clearly reduced. This can be important in the case of high-quality laser modules, e.g., single-mode laser diodes with great coherence length.

Method (c) combines the advantages of method (a), i.e., great differences in reflection factor between core and cladding, with those of method (b), i.e., reduced reflection from the fiber core end face, and gives a reflection factor of the cladding region which exceeds that of the core region by a factor of 99. This method requires two different preparation steps, however. With the lens system 12, 13 correctly adjusted, the undeviated laserr light ray 7 is focused precisely on the core region 22 and, thus, coupled as efficienttly as possible into the optical waveguide 3 (cf. FIG. 2A). At the same time, the diffracted first-order rays 8, 9, 10, 11 strike the cladding region 23, which, as explained above, has a considerably higher reflectivity than the core region 22. It is naturally sufficient for the reflectivity to be higher at the operating wavelength of the laser diode 2. If the lens system 12, 13 is properly adjusted, the rays 8 to 11 are thus reflected back onto themselves and go through the lenses 13, 12, the beam splitter 6, and the lens 15 to the detector 16. This detector 16 is designed as a quadrant detector (cf. FIGS. 3A to 3C), i.e., it has four quadrants or segments 24, 25, 26, and 27 each of which detects the light incident on its surface independently of the three other quadrants.

The lens 15 ensures that, if the lens system 12, 13 is adjusted properly, all four detector quadrants 24, 25, 26, and 27 are struck evenly by the reflected rays 8 to 11, respectively (FIGS. 2A and 3A).

In case of improper adjustment in the x- or y-axis of the end face 14, part of the detector quadrants 24 to 27 will be struck unevenly by the reflected rays. In the following, the signals produced by the four quadrants 24, 25, 26, and 27 are designated D1, D2, D3, and D4, respectively. The error signal produced if the rays strike quadrants unevenly, D2−D4 (x-axis) or
D1−D3 (y-axis) or
(D1−D3)±(D2−D4) (both axes), can be used directly to focus the laser beam 7 on the core region 22 of the optical waveguide. The error signal causes the positioning device 18 to move the lens system 12, 13 in the x-direction and/or y-direction until maximum coupling efficiency is achieved.

Controlled adjustment of the focusing in the z-direction, e.g., in the direction of the beam axis, is not normally necessary since the depth of focus in the plane of the light-spot image on the end face has a sufficient tolerance which can be readily held during the manufacture and presetting of the optical transmitter module 1.

If focusing control in the direction of the beam axis, i.e., control of the distance between the lens system 12, 13 and the end face 14, should be necessary nevertheless—e.g., to control the phase of laser light to be coupled into a fiber—, this can be readily accomplished by astigmatic focus control. For such control, use can be made of the quadrant detector 16, but a cylindrical lens must be placed in the reflected light path. If the laser beam is not correctly adjusted, this cylindrical lens causes an astigmatic distortion of the reflected light beam, and this distortion can be detected by the detector 16.

The optical transmitter 1 can also be implemented with a well-known holographic optical element which may also perform the functions of the beam splitter 6 and the optical imaging systems 12, 13, 15. In that case, it is also advantageous to combine the laser diode 2 and the quadrant detector 16 in one hybrid unit. This simplifies the construction of the optical transmitter or receiver 1.

Figure 4:
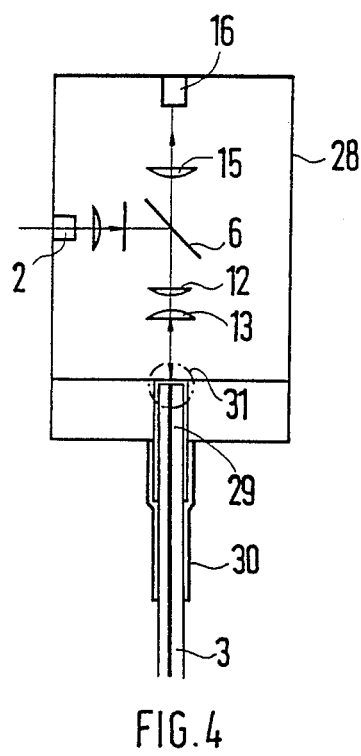
FIG. 4 shows another embodiment of an optical transmitter or receiver module according to the invention.
Figure 5:
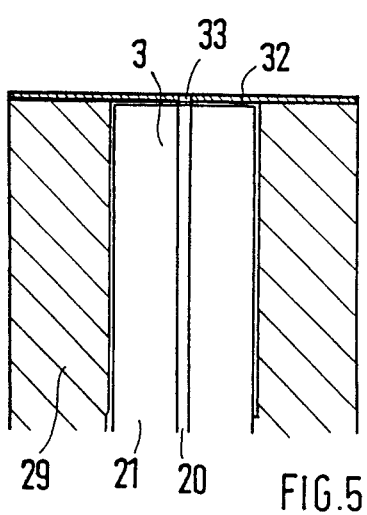
FIG. 5 shows an enlarged portion of the component of FIG. 4.

In the embodiment of the optical transmitter or receiver module shown schematically in FIGS. 4 and 5, the parts of the module—which are designated by the same reference characters as in FIGS. 1 to 3—are housed in a case 28. This embodiment differs from that of FIG. 1 in that the end portion of the optical waveguide 3 is fixed in a passive guide sleeve 29 which, in turn, is inserted in a protective sleeve 30.

FIG. 5 is an enlarged view of the fiber-end portion marked in FIG. 4 by a dash-dot circle 31. The guide sleeve 29 has a reflecting cover 32 for the cladding region and a round light entry port 33 for the core region of the end face of the optical waveguide 3. The optical waveguide 3 is soldered or glued to the guide sleeve 29. In the case of a single-mode fiber, the diameter of the light entry port 33 is about 10 $\mu$m.

From a manufacturing point of view, this embodiment has the considerable advantage that the entire optical module, including the focusing control and the case 28, can be fully tested already before being coupled to the end of the optical waveguide.

According to information from manufacturers, the corecladding concentricity error is not greater than $\pm 1$ $\mu$m, so that, as a result of the restricted guidance of the optical waveguide 3 in the guide sleeve 29, no appreciable losses are introduced when light is coupled through the round entry port 33 into the optical waveguide.

Figure 6:
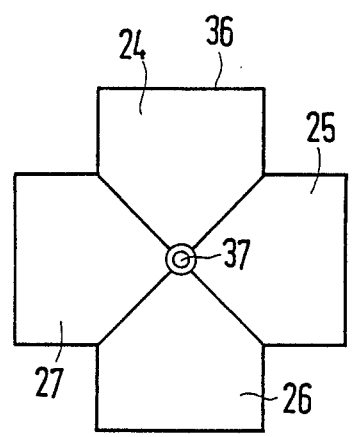
FIG. 6 shows a detector used in a further embodiment of the invention.

In a bidirectional optical communication system, the optical module in accordance with the invention can be used both as a transmitter and as a receiver if a light detector 37 is located at the center of the quadrant detector 36 (FIG. 6). For high-bit-rate applications, the light detector should have a small area. It is implemented as a PIN or APD detector, for example.

The quadrant detector 36 with the central light detector 37 can also be implemented on a single semiconductor chip, whereby manufacturing costs are considerably required.

A special advantage of the embodiment of FIG. 6 lies in the fact that the active control of the coupling of laser light into the optical waveguide 3 also ensures an optimum alignment of the light detector 37 with respect to the light signals emerging from the optical waveguide 3. Thus, both laser-to-fiber and fiber-to-detector coupling losses are minimized with one control facility.

I claim:

1. Optical module comprising:
    an optoelectronic transmitter for emitting a beam of light,
    an optical fiber terminated by an end face on which is defined a core region surrounded by a second region having a reflection factor higher than that of the core region,
    adjustable coupling means for adjustably positioning the light beam from the optoelectronic light transmitter relative to the end face of the optical fiber, wherein the position of the light beam relative to the core region is adjusted to an optimum position in which a central portion of the light beam is coupled into the optical fiber with minimum loss, and
    control means responsive to an electrical control signal for adaptively adjusting the coupling means to maintain said optimum position, said control means further comprising:
        a detector having at least two opposing sectors fixedly positioned relative to said end face such that when said light beam is in said optimum position, approximately equal peripheral portions of said light beam are reflected onto each of said sectors from said second region, and such that as the reflected light beam portions shift in a first predetermined direction from a first sector to an opposing second sector, less of the reflected peripheral light beam portion incident on the first sector is reflected from said higher reflectivity region and more of said incident light beamm portion is reflected from the lower reflectivity core region, and
        means for generating said electrical control signal in response to the intensity of the reflected light beam portions incident on said opposing sectors,
    whereby any differences between the electrical outputs from two opposing sectors resulting from movement of a reflected light beam portion from a first position incident the first sector to a second position incident on the second sector is magnified by said reflectivity differences of the two end face regions, and
    whereby as a particular portion of the light beam which is reflected onto a particular sector moves from a first position such that it is reflected from the higher reflectivity second region to a second position where it is reflected off the lower reflectivity core region, a control signal representative of such movement is obtained from the sectors.

2. An optical module as claimed in claim 1, wherein the second region of the end face of the optical fiber is a cladding region provided with a reflecting coating.

3. An optical module as claimed in claim 1, wherein the core region of the end face of the optical fiber is provided with an antireflection coating.

4. An optical module as claimed in claim 1, wherein an end portion including the end face is enclosed in a cylindrical sleeve terminated with an end cover defining an annular reflecting cover and a central light entry port positioned over the core region, whereby said second region is defined by said annular reflecting cover.

5. An optical module as claimed in claim 1, wherein said control means further comprises:
    a crossed grating for producing at least two beam portions in each of two different planes from a single said light beam,
    means for projecting said beam portions onto the end face of the optical fiber, and
    a quadrant detector for measuring each of said beam portions after it has been reflected by the end face.

6. An optical module as claimed in claim 5, wherein said coupling means comprises:
    a lens responsive to the quadrant detector for adaptively focusing at least a central portion of said light beam onto the core region of the end face of the optical fiber.

7. An optical module as claimed in claim 1, wherein said coupling means comprises:
    a cylindrical lens positioned in the path of the light beam between the optoelectronic transmitter and the optical fiber for producing astigmatism in the light beam such that no astigmatic difference is detectable at a predetermined focus point when the light beam is properly coupled between the transmitter and the fiber and
    means for refocusing the light beam in response to detected astigmatic differences.

8. An optical module as claimed in claim 1, further comprising
a quadrant detector provided with an integrated central photodetector.

9. An optical module as claimed in claim 1, wherein said coupling means comprises a holographic optical element acting as a beam splitter and a cylindrical lens, and said optoelectronic transmitter and said control means comprise a common hybrid module containing a laser and a detector.

* * * * *